(12) United States Patent
Sundelin (10) Patent No.: US 12,202,308 B2
(45) Date of Patent: Jan. 21, 2025

(54) SWIM-ARRANGEMENT FOR AMPHIBIOUS TRACKED VEHICLE

(71) Applicant: BAE SYSTEMS HÄGGLUNDS AKTIEBOLAG, Örnsköldsvik (SE)

(72) Inventor: Tom Sundelin, Domsjö (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 447 days.

(21) Appl. No.: 17/442,366

(22) PCT Filed: Mar. 25, 2020

(86) PCT No.: PCT/SE2020/050309
§ 371 (c)(1),
(2) Date: Sep. 23, 2021

(87) PCT Pub. No.: WO2020/197479
PCT Pub. Date: Oct. 1, 2020

(65) Prior Publication Data
US 2022/0169086 A1 Jun. 2, 2022

(30) Foreign Application Priority Data

Mar. 28, 2019 (SE) .................................. 1950380-4

(51) Int. Cl.
*B60F 3/00* (2006.01)
*B62D 55/10* (2006.01)

(52) U.S. Cl.
CPC .......... *B60F 3/0015* (2013.01); *B60F 3/0038* (2013.01); *B60F 3/0046* (2013.01); *B62D 55/10* (2013.01)

(58) Field of Classification Search
CPC ........ B60F 3/00; B60F 3/0007; B60F 3/0015; B60F 3/0038; B60F 3/0046; B63H 1/34;
(Continued)

(56) References Cited

U.S. PATENT DOCUMENTS 2,914,017 A * 11/1959 Ruger .................. B60F 3/0015
440/95
3,313,263 A * 4/1967 Ferguson ............... B62D 55/08
440/98
(Continued)

FOREIGN PATENT DOCUMENTS

CA 2679824 A1 3/2011
CN 208630278 U 3/2019
(Continued)

OTHER PUBLICATIONS

Extended European Search Report received for European Patent Application No. 20779772.1 mailed on Dec. 5, 2022, 7 pages.
(Continued)

*Primary Examiner* — Ajay Vasudeva
(74) *Attorney, Agent, or Firm* — Morrison & Foerster LLP (57) ABSTRACT

The invention relates to a swim arrangement (A) for facilitating amphibious operation of a tracked vehicle (V1). Said tracked vehicle comprises a vehicle body (10) and a two track assemblies (T1, T2) suspendedly connected to the vehicle body for driving the vehicle, each track assembly (T1, T2) comprising a drive means driven endless track (4). The vehicle body comprises under structure portions (12, 14), each under structure portion (12, 14) miming over an upper side (4a) of a track (4) of a track assembly (T1, T2). Each under structure portion (12, 14) is configured to be arranged at a distance from the upper side (4a) of the track (4) during land operation of the vehicle so that a space (S1, S2) is provided. The arrangement (A) comprises means (20, 30, 100) for reducing said space (S1, S2) so as to, during swimming operation, reduce the flow of water between the under structure portion (12, 14) and the upper side (4a) of the track (4) caused when the tracks (4) are driven.

9 Claims, 4 Drawing Sheets

(58) Field of Classification Search
CPC .............. B63H 2001/342; B62D 55/10; B62D 55/116; B62D 55/20; B62D 55/247
See application file for complete search history.

(56) References Cited

U.S. PATENT DOCUMENTS

| | | | |
|---|---|---|---|
| 8,002,596 B2* | 8/2011 | Wernicke | B63H 1/34 440/12.63 |
| 2002/0022415 A1 | 2/2002 | Choi | |
| 2009/0124142 A1 | 5/2009 | Wernicke et al. | |
| 2015/0111446 A1 | 4/2015 | Nordberg et al. | |

FOREIGN PATENT DOCUMENTS

| | | |
|---|---|---|
| DE | 1188468 B | 3/1965 |
| EP | 386102 B1 | 9/1993 |
| GB | 1315909 A | 5/1973 |
| GB | 2038252 A | 7/1980 |
| KR | 101747227 B1 | 6/2017 |
| WO | WO-2013043110 A1 | 3/2013 |
| WO | WO-2013043112 A1 | 3/2013 |
| WO | WO-2017017065 A1 | 2/2017 |
| WO | WO-2017017066 A1 | 2/2017 |
| WO | WO-2018152623 A1 | 8/2018 |

OTHER PUBLICATIONS

Office Action received for Singaporean Patent Application No. 11202109099Q mailed on Aug. 4, 2023, 5 pages.
International Search Report and Written Opinion for International Application No. PCT/SE2020/050309 mailed on Mar. 19, 2020, 15 pages.
Office Action and Search Report received for Chinese Patent Application No. 202080023746.8 mailed on Jun. 13, 2024, 18 pages. English translation.

* cited by examiner

Fig. 5

SWIM-ARRANGEMENT FOR AMPHIBIOUS TRACKED VEHICLE

CROSS REFERENCE TO RELATED APPLICATIONS

This application is a national stage application under 35 U.S.C. § 371 of International Application No. PCT/SE2020/050309, filed internationally on Mar. 25, 2020, which claims priority to SE 1950380-4, filed Mar. 28, 2019, the entire contents of each are incorporated by reference herein.

TECHNICAL FIELD

The present invention relates to an arrangement for an amphibious tracked vehicle. The present invention relates to a tracked vehicle.

BACKGROUND

Tracked vehicles comprising articulated tracked vehicle are in certain cases amphibious and can swim. Characteristics for swimming with articulated vehicles of today is that they swim with own displacement. They thus run deep in the water and the speed in water becomes low due to the vehicle being short. In addition propulsion, i.e. swimming operation, with the tracks as drive source has poor efficiency.

There is thus a need to present improvements in arrangements for amphibious tracked vehicles.

OBJECT OF THE INVENTION

An object of the present invention is to provide a swim arrangement for facilitating amphibious operation of a tracked vehicle, which facilitates improved swimming operation by means of the tracks of the amphibious tracked vehicle.

A further object of the present invention is to provide a tracked vehicle comprising such swim arrangement.

SUMMARY OF INVENTION

These and other objects, which will become apparent from the following description, are achieved by a swim arrangement for a tracked vehicle and a tracked vehicle as set out in the appended independent claims. Preferred embodiments of the swim arrangement are defined in the appended dependent claims.

Specifically an object of the invention is achieved by a swim arrangement for facilitating amphibious operation of a tracked vehicle. Said tracked vehicle comprises one or more vehicle bodies and at least one track assembly pair per vehicle body, said track assembly pair being suspendedly connected to the vehicle body. The track assembly pair comprises two track assemblies for driving the vehicle, each track assembly comprising a drive means driven endless track arranged to run over a set of wheels of the track assembly. The vehicle body comprises under structure portions, each under structure portion running over an upper side of a track of a track assembly. Each under structure portion is configured to be arranged at a distance from the upper side of the track during land operation of the vehicle so that a space is provided between each under structure portion and the upper side of the track of the corresponding track assembly. The arrangement comprises means for, in connection to swimming operation, reducing said space so as to reduce the flow of water between the under structure portion and the upper side of the track caused when the tracks are driven.

By thus reducing said space so that possibility for water to flow in said space is reduced, e.g. essentially prevented, there will be reduced water forced by the rotating track in the forward direction on the upper side of the track so that the counteractive force, which reduces the forward speed of the vehicle, is significantly reduced, thus improving the propulsion of the vehicle by means of increasing the resulting overall forward force on the vehicle, created by rotation of the tracks of the track assemblies.

According to an aspect of the present disclosure the swim arrangement for facilitating amphibious operation of a tracked vehicle is a swim arrangement at a tracked vehicle. According to an aspect of the present disclosure the swim arrangement for facilitating amphibious operation of a tracked vehicle is a swim arrangement of a tracked vehicle. According to an aspect of the present disclosure the swim arrangement for facilitating amphibious operation of a tracked vehicle is configured to be comprised in said tracked vehicle.

According to an embodiment of the arrangement said means for reducing said space, for each space, comprises an elongated member associated with the vehicle body and configured to be introduced within said space. By thus utilizing elongated members for the respective space efficient reduction of the space for improved swimming operation of the tracked vehicle is facilitated. By thus reducing said space by means of elongated members introduced within said space so that possibility for water to flow in said space is reduced, e.g. essentially prevented, an efficient way is obtained of reducing water forced by the rotating track in the forward direction on the upper side of the track so that the counteractive force, which reduces the forward speed of the vehicle, is significantly reduced, thus improving the propulsion of the vehicle by means of increasing the resulting overall forward force on the vehicle, created by rotation of the tracks of the track assemblies. According to an aspect of the present disclosure, the respective elongated member is configured to provide an outer structure providing a volume within the respective space, which outer structure does not allow water there through.

According to an embodiment of the arrangement the elongated member introduced within said space is configured to increase the displacement ability of the vehicle. By thus increasing the displacement ability of the vehicle it is facilitated to improve swimming operation of the tracked vehicle.

According to an embodiment of the arrangement the elongated member is configured to be lowered towards the upper side of a track of a track assembly so as to reduce said space. Hereby an efficient way of reducing the space by means of the elongated member is provided.

According to an embodiment of the arrangement the elongated member comprises an under structure portion of the vehicle body, said under structure portion being configured to be lowered towards the upper side of a track of a track assembly. By thus utilizing the under structure of the vehicle body an efficient way of reducing the space is provided.

According to an embodiment of the arrangement the elongated member comprises expansion means configured to expand the elongated member so as to introduce the elongated member within said space. Hereby an efficient way of reducing the space by means of the elongated member is provided.

According to an embodiment of the arrangement the elongated member comprises buoyancy increasing means. By thus utilizing buoyancy increasing means the amphibious operation comprising swimming operation and buoyancy of the tracked vehicle will be improved.

According to an embodiment of the arrangement the buoyancy increasing means comprises one or more floating blocks and/or one or more bellow devices and/or one or more expandable volumes. By thus utilizing such buoyancy increasing means the amphibious operation comprising swimming operation and buoyancy of the tracked vehicle will be improved.

According to an embodiment of the arrangement the means for reducing said space comprises a level changing device for reducing the distance between the under structure portions and the upper side of the tracks by lowering the vehicle body relative to the at least one track assembly pair. Hereby said space may be efficiently reduced by means of the vehicle body without the need for additional elongated members.

According to an embodiment of the arrangement the means for reducing said space comprises a control arrangement for controlling reduction of said space.

The control arrangement is arranged to control reduction of said space so that said space is reduced in connection to an amphibious operation, i.e. swimming operation, and so that a reduced space is returned when changing to land operation and maintained during land operation. Hereby reduction of said space may be efficiently controlled.

According to an embodiment of the arrangement the control arrangement is configured to control reduction of said space based on one or more of position of the vehicle, level of water surrounding the vehicle, amphibious operation activation by operator. Hereby reduction of said space may be efficiently controlled.

Specifically an object of the invention is achieved by a tracked vehicle comprising a swim arrangement as set out herein.

According to an embodiment said tracked vehicle is an articulated tracked vehicle comprising a first vehicle unit and a second vehicle unit pivotably connected to the first vehicle unit via an articulation joint, each of said vehicle units comprising a vehicle body and track assembly pair suspendedly connected to respective vehicle body.

Specifically an object of the invention is achieved by a tracked vehicle comprising a swim arrangement as set out herein.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION OF THE INVENTION

Herein the term "land operation" refers to any situation when the amphibious tracked vehicle is on land and not being in connection to an amphibious operation. The term "land operation" refers to the amphibious tracked vehicle being on the ground and driving on the ground or being prepared for driving on the ground.

Herein the term "amphibious operation" refers to any situation when the amphibious tracked vehicle is being operated in water, comprising swimming operation.

Herein the term "swimming operation" refers to any situation when the amphibious tracked vehicle is being propelled in water by means of rotation of the tracks of the track assemblies of the tracked vehicle.

Herein the term "reducing said space" when referring to the space provided between each under structure portion and upper side of the track of the corresponding track assembly may refer to introduction of an outer structure providing a volume within said space.

The tracked vehicle according to the present disclosure may be any tracked vehicle suitable for amphibious operation. The tracked vehicle according to the present disclosure may thus be any suitable amphibious tracked vehicle having left and right track assemblies wherein under structure portions are running over and at a certain distance from the upper side of the of the track of the respective track assembly. The tracked vehicle according to the present disclosure may be a single tracked vehicle. The tracked vehicle according to the present disclosure may be an articulated tracked vehicle comprising a first vehicle unit and a second vehicle unit pivotably connected to the first vehicle unit via an articulation joint. The tracked vehicle according to the present disclosure may be operated by any suitable drive means such as an internal combustion engine and or/or an electric motor. One or more tracks of the track assemblies of the tracked vehicle may be rotated during swimming operation.

Figure 1:
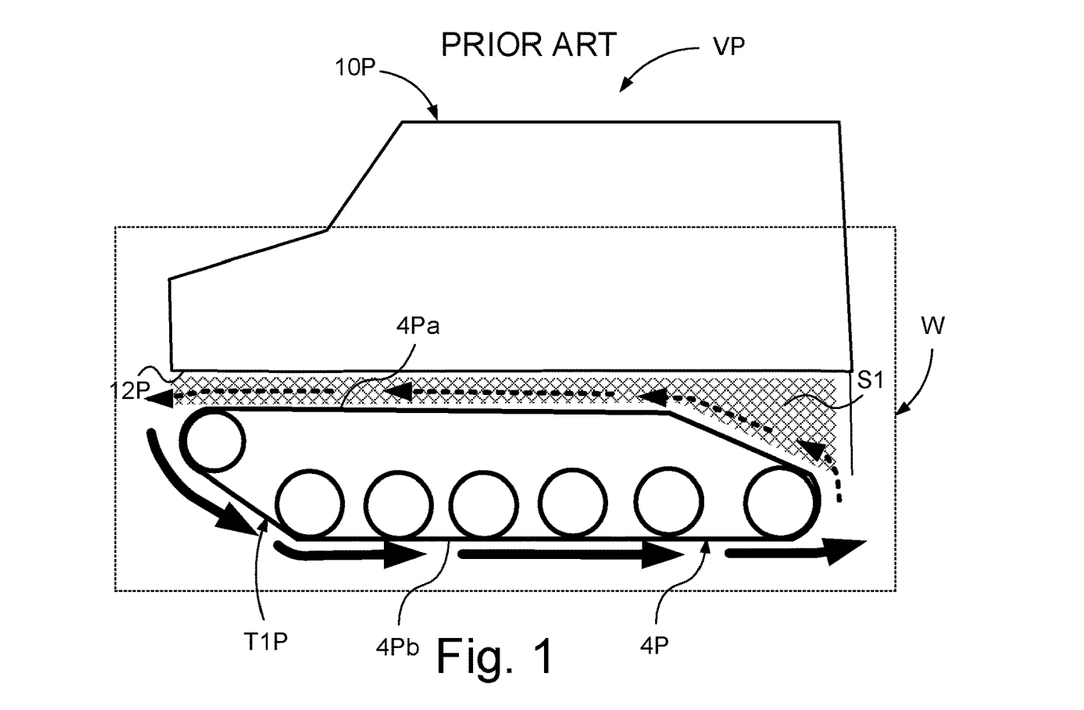
FIG. 1 schematically illustrates a side view of a tracked vehicle during amphibious operation according to prior art.

FIG. 1 schematically illustrates a side view of a tracked vehicle V1P during an amphibious operation according to prior art. The vehicle V1P is viewed from the left side. The vehicle V1P is swimming in water W.

The tracked vehicle V1P comprises a track assembly pair. The track assembly pair comprises opposite track assemblies for driving the vehicle, a left track assembly T1P, shown in FIG. 1, and a right track assembly.

The tracked vehicle V1P comprises a vehicle body 10P. The track assembly pair is suspendedly connected to the vehicle body 10P.

Each track assembly comprises an endless track 4P arranged to run over a set of wheels of the track assembly T1P.

The vehicle body 10P comprises under structure portions, a left under structure portion 12P, shown in FIG. 1, running over an upper side 4PaP of a track 4P of a track assembly at a distance from the upper side of the track. A space SP is hereby provided between each under structure portion 12P and the upper side 4Pa of the track 4P of the corresponding track assembly.

During swimming operation by means of rotating the tracks of the respective track assembly, water will be transported around the tracks 4P as illustrated in FIG. 1. Thus, during swimming operation by means of rotation of the tracks 4P water will flow in the backward direction on the underside 4Pb of the track 4P, illustrated by the solid arrows, and water will flow in the forward direction on the upper side 4Pa of the track 4P within said space SP, illustrated by the dotted arrows. The water forced by the rotating track 4P in the backward direction on the underside 4Pb of the track is providing a forward force on the vehicle V1P. The water forced by the rotating track 4P in the forward direction on the upper side 4Pa of the track 4P is providing a backward force on the vehicle V1P, reducing the efficiency of the swimming operation of the vehicle V1P.

Figure 2:
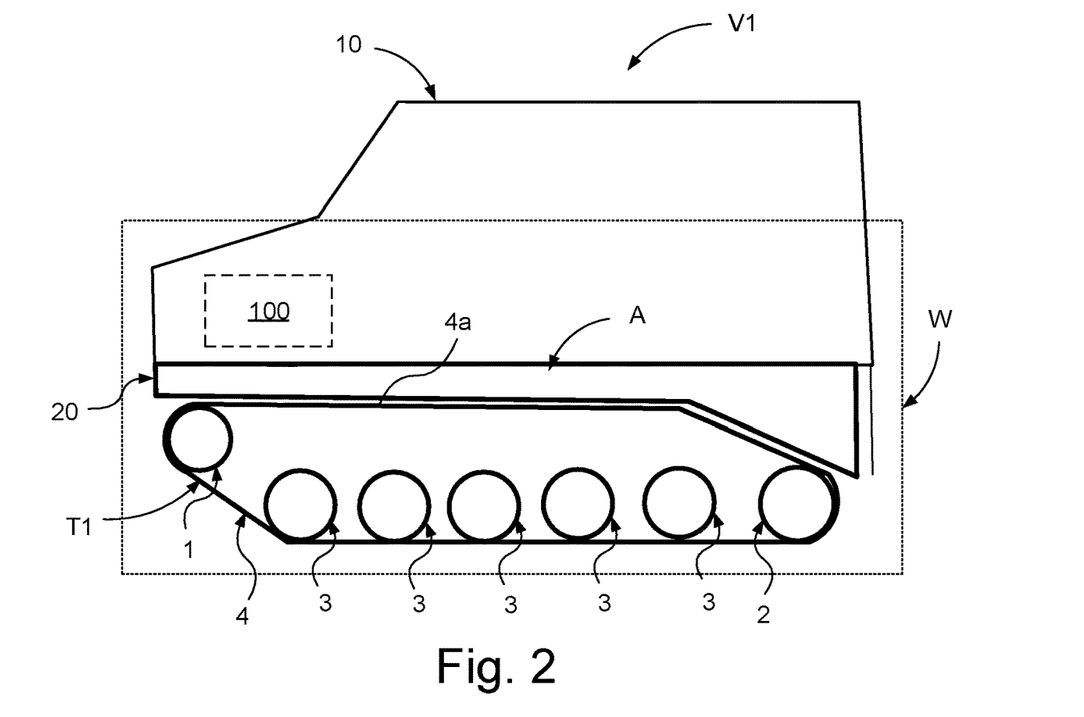
FIG. 2 schematically illustrates a side view of a tracked vehicle during amphibious operation according to an embodiment of the present disclosure.

FIG. 2 schematically illustrates a side view of a tracked vehicle V1 during an amphibious operation according to an embodiment of the present disclosure. The vehicle V1 is viewed from the left side. The vehicle V1 is swimming in water W.

Figure 3A:
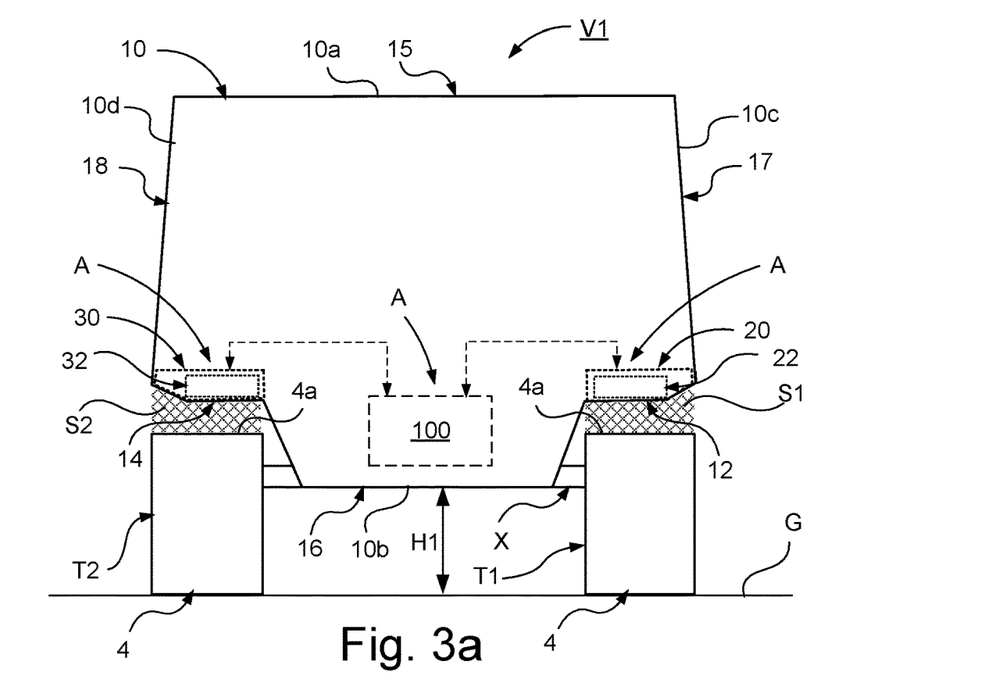
FIG. 3a schematically illustrates a front view of the tracked vehicle in FIG. 2 during a land operation according to an embodiment of the present disclosure.
Figure 3B:
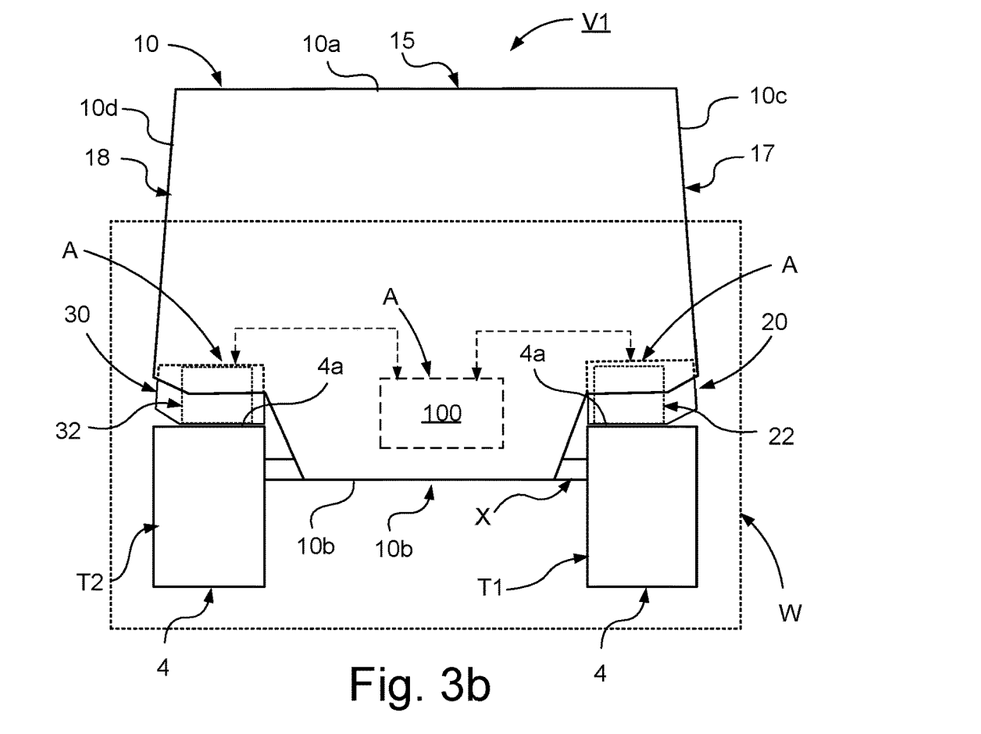
FIG. 3b schematically illustrates a front view of the tracked vehicle in FIG. 2 during an amphibious operation according to an embodiment of the present disclosure.

FIG. 3a schematically illustrates a front view of the tracked vehicle V1 in FIG. 2 during land operation according to an embodiment of the present disclosure, and FIG. 3b schematically illustrates a front view of the tracked vehicle in FIG. 2 during an amphibious operation according to an embodiment of the present disclosure. In FIG. 3a the tracked vehicle V1 is operating and thus standing/running on solid ground G. In FIG. 3b the tracked vehicle V1 is swimming in water W as in FIG. 2.

The tracked vehicle V1 has essentially the same general design as the tracked vehicle V1P in FIG. 1.

The tracked vehicle V1 comprises a track assembly pair T1, T2 as seen in FIG. 3a-b. The track assembly pair comprises opposite track assemblies T1, T2 for driving the vehicle, a left track assembly T1, and a right track assembly T2. The left track assembly T1 is shown in FIG. 2.

The tracked vehicle V1 comprises a vehicle body 10. The track assembly pair is suspendedly connected to the vehicle body 10.

The respective track assembly, in FIG. 2 illustrated with the left track assembly T1, comprises two end wheels 1, 2 in the form of a front wheel 1 and a rear wheel 2, and further a plurality of road wheels 3 there between. The front wheel 1 is according to the present disclosure a drive wheel 1 and the rear wheel 2 is according to the present disclosure a tension wheel 2. The respective track assembly, in FIG. 2 illustrated with the left track assembly T1, further comprises a plurality of road wheels 3.

The respective track assembly, in FIG. 2 illustrated with the left track assembly T1, further comprises an endless track 4. Said endless track 4 is configured to be disposed around said end wheels 1, 2 and plurality of road wheels 3. The endless track 4 is thus configured to run around the drive wheel 1, tension wheel 2 and plurality of road wheels 3. Each track assembly T1, T2 thus comprises an endless track 4 arranged to run over a set of wheels of the track assembly T1 T2.

The endless track 4 is a propulsion track 4 running around said wheels 1, 2, 3 for driving the vehicle V1. The endless track 4 has an inner side with an inner surface which at least partly is in contact with the wheels 1, 2, 3 when the endless track is running around the wheels 1, 2, 3. The endless track 4 has an outer side with an outer surface which, during swimming operation, will be in contact with water and move the water when the endless track is running around the wheels 1, 2, 3. When the endless track is running around the wheels 1, 2, 3 a portion of the outer side will be faced upwardly and thus be an upper side 4a and an opposite portion of the outer side will face downwardly and thus be an underside 4b.

The drive wheel 1 is configured to be operated by any suitable drive means such as an internal combustion engine and or/or an electric motor. The drive wheel 1 is configured to be rotated by the drive means for rotating the endless track for driving the vehicle. The drive wheel 1 is according to an aspect of the disclosure configured to be operably connected to the drive means via a drive axle X as illustrated in FIG. 3a-b.

Further the vehicle V1 comprises a vehicle body 10. According to an aspect of the present disclosure, the vehicle body 10 includes the chassis of the vehicle V1. According to an aspect of the present disclosure, the vehicle body 10 may include the bodywork.

The vehicle body 10 comprises under structure portions 12, 14, see FIG. 3a, configured to, during land operation of the vehicle V1, run over an upper side 4a of a track 4 of a track assembly at a distance from the upper side 4a of the track 4, providing a space S1, S2.

As shown in FIG. 3a, the vehicle body 10 comprises a left under structure portion 12 running over an upper side 4a of a track 4 of the left track assembly T1 at a distance from the upper side 4a of the track 4 providing a space S1, i.e. a left space S1. As shown in FIG. 3a, the vehicle body 10 comprises a right under structure portion 14 running over an upper side 4a of a track 4 of the right track assembly T2 at a distance from the upper side 4a of the track 4 providing a space, i.e. a right space S2. A space S1, S2 is hereby provided between each under structure portion 12, 14 and the upper side 4a of the track 4 of the corresponding track assembly T1, T2.

As shown in FIG. 3a-b, the vehicle body 10 comprises a roof portion 15. The vehicle body 10 comprises an upper side 10a. The upper side 10a constitutes the upper side of the roof portion 15 of the vehicle body 10.

As shown in FIG. 3a-b, the vehicle body 10 comprises a central under structure 16 centrally arranged between the left track assembly T1 and right track assembly T2. The vehicle body 10 comprises a central underside 10b. The central underside 10b constitutes the underside of the central under structure 16. The underside 10b of the central under structure 16 is according to an aspect of the present disclosure configured to be at a level below the upper side 4a of the track 4 of the respective track assembly T1, T2. The underside 10b of the central under structure 16 is according to an aspect of the present disclosure configured to be at a certain height above the ground G, see FIG. 3a, providing a desired ground clearance. The central under structure 16 is according to an aspect of the present disclosure configured to be suspendedly connected to the track assembly pair T1, T2. The central under structure 16 may according to an aspect of the present disclosure be configured to house drive means of the vehicle V1.

As shown in FIG. 3a-b, the vehicle body 10 comprises a left wall portion 17. The vehicle body 10 comprises a left side 10c. The left side 10c constitutes the external side of the left wall portion 17 of the vehicle body 10.

The transversal extension of the left wall portion 17 essentially corresponds to the transversal extension of the outer side of the left track assembly T1. The lower portion of the left wall portion 17 is arranged in connection to the left under structure portion 12.

As shown in FIG. 3a-b, the vehicle body 10 comprises a right wall portion 18 opposite to the left wall portion 17. The vehicle body 10 comprises a right side 10d. The right side 10c constitutes the external side of the right wall portion 18 of the vehicle body 10.

The transversal extension of the right wall portion 18 essentially corresponds to the transversal extension of the outer side of the right track assembly T1. The lower portion of the right wall portion 18 is arranged in connection to the right under structure portion 14.

Thus, the width of the vehicle body 10 essentially corresponds to the width of the track assembly pair T1, T2. Hereby the under structure portions 12, 14 run over the respective track assembly T1, T2.

The tracked vehicle V1 comprises according to an aspect of the present disclosure a suspension system. The suspension system may be any suitable suspension system. The suspension system comprises according to an aspect of the present disclosure a suspension device for the respective track assembly. The respective track assembly of the tracked vehicle V1 is thus arranged to be supported by the vehicle body 10 by means of said suspension device. The road wheels 3 of the respective track assembly of the tracked vehicle V1 is according to an aspect of the present disclosure arranged to be supported by the vehicle body 10 by means of said suspension device.

Said track assemblies T1, T2 may be suspendedly arranged to said vehicle body 10 via said road wheels 3 by means of the suspension system.

The amphibious tracked vehicle V1 comprises an arrangement A for facilitating swimming operation of the tracked vehicle. The arrangement A comprises means 20, 30, 100 for, during swimming operation, reducing said space S1, S2 between said under structure portions 12, 14 and upper side 4a of the tracks so as to reduce flow of water between under structure portion 12, 14 and upper side of the track 4 of the respective track assembly T1, T2 caused when the tracks 4 are driven. Thus, when the tracks are driven they are rotating, providing said flow of water during swimming operation.

Thus, during swimming operation by means of rotation of the tracks 4 water will flow in the backward direction on the underside 4b of the track 4 providing a forward force on the vehicle V1.

By thus reducing said space S1, S2 by means of said means 20, 30, 100 so that possibility for water to flow in said space is reduced, e.g. essentially prevented, there will be essentially no water forced by the rotating track 4 in the forward direction on the upper side 4a of the track 4 so that essentially no backward force on the vehicle V1 is provided, thus improving the propulsion of the vehicle by means of rotation of the tracks 4 of the track assemblies T1, T2.

Said means for reducing said space S1, S2 comprises elongated members 20, 30 associated with the vehicle body 10 and configured to be introduced within said space S1, S2 above the upper side 4a of a track 4 of a track assembly T1, T2 in connection to an amphibious operation of the vehicle V1.

Said means for reducing said space comprises elongated members 20, 30 for reducing the space S1, S2 in connection to, i.e. above, the respective track assembly T1, T2. Thus the means for reducing said space comprises a left elongated member 20 for reducing the left space S1 and a right elongated member 30 for reducing the right space S2.

The left elongated member 20 is configured to be introduced within said left space S1 above the upper side 4a of a track 4 of a track assembly so as to reduce the left space S1. The left elongated member 20 is configured to be introduced within said left space S1 so as to occupy a portion of the left space S1 so that the left space S1 is reduced corresponding to said occupied portion of the left space S1. The left elongated member 20 is configured to be introduced within said left space S1 in connection to an amphibious operation of the vehicle V1.

The right elongated member 30 is configured to be introduced within said right space S2 above the upper side 4a of a track 4 of a track assembly so as to reduce the right space S2. The right elongated member 30 is configured to be introduced within said right space S2 so as to occupy a portion of the right space S2 so that the right space S2 is reduced corresponding to said occupied portion of the right space S2. The right elongated member 30 is configured to be introduced within said right space S2 in connection to an amphibious operation of the vehicle V1.

According to an aspect of the present disclosure, the respective elongated member 20, 30 is configured to provide a volume within the respective space S1, S2, which volume does not allow water there through. The left elongated member 20 is configured to provide a volume within the left space S1, which volume does not allow water there through. The right elongated member 30 is configured to provide a volume within the right space S2, which volume does not allow water there through.

According to an aspect of the present disclosure, the respective elongated member 20, 30 is configured to provide an outer structure providing a volume within the respective space S1, S2, which outer structure does not allow water there through. The left elongated member 20 is configured to provide an outer structure providing a volume within the left space S1, which volume does not allow water there through. The right elongated member 30 is configured to provide an outer structure providing a volume provide a volume within the right space S2, which volume does not allow water there through.

The left elongated member 20 is according to an aspect of the disclosure configured to be associated with the left under structure portion 12. The left elongated member 20 is according to an aspect of the disclosure configured to be arranged in connection to the left under structure portion 12. The left elongated member 20 is according to an aspect of the disclosure configured to comprise the left under structure portion 12. The left elongated member 20 is according to an aspect of the disclosure configured to be comprised in the left under structure portion 12. The left elongated member 20 is according to an aspect of the disclosure configured to provide a volume within the space S1 above the track 4 of the left track assembly T1.

The right elongated member 30 is according to an aspect of the disclosure configured to be associated with the right under structure portion 14. The right elongated member 30 is according to an aspect of the disclosure configured to be arranged in connection to the right under structure portion 14. The right elongated member 30 is according to an aspect of the disclosure configured to comprise the right under structure portion 14. The right elongated member 30 is according to an aspect of the disclosure configured to be comprised in the right under structure portion 14. The right elongated member 30 is according to an aspect of the disclosure configured to provide a volume within the space S2 above the track 4 of the right track assembly T2.

According to an aspect of the present disclosure, the respective elongated member 20, 30 introduced within the respective space S1, S2 is configured to increase the displacement ability of the vehicle V1. According to an aspect of the present disclosure, the respective elongated member 20, 30 introduced within the respective space S1, S2 is configured to increase the liquid tight volume of the vehicle V1 in connection to an amphibious operation of the vehicle V1. Thus, the respective elongated member 20, 30 comprises displacement increasing means.

The left elongated member 20 introduced within the space S1 between left under structure portion 12 and the upper side 4a of the track 4 of the left track assembly T1 is configured to increase the displacement ability of the vehicle V1. The left elongated member 20 introduced within the space S1 comprises a displacement increasing volume.

The right elongated member 20 introduced within the space S2 between right under structure portion 14 and the upper side 4a of the track 4 of the right track assembly T2 is configured to increase the displacement ability of the vehicle V1. The right elongated member 20 introduced within the space S2 comprises a displacement increasing volume.

According to an aspect of the present disclosure, the respective elongated member 20, 30 comprises buoyancy increasing means. According to an aspect of the present disclosure, the buoyancy increasing means comprises one or more floating blocks and/or one or more bellow devices. The buoyancy increasing means may be arranged within a volume of the elongated member 20, 30 formed by external elements. The volume formed by external elements may have a box-like shape essentially corresponding to the shape of the space S1, S2.

According to an aspect of the present disclosure, the left elongated member 20 comprises buoyancy increasing means. According to an aspect of the present disclosure, the buoyancy increasing means comprises one or more floating blocks and/or one or more bellow devices. The buoyancy increasing means may be arranged within a volume of the left elongated member 20 formed by external elements. The volume formed by external elements may have a box-like shape essentially corresponding to the shape of the left space S1.

According to an aspect of the present disclosure, the right elongated member 30 comprises buoyancy increasing means. According to an aspect of the present disclosure, the buoyancy increasing means comprises one or more floating blocks and/or one or more bellow devices. The buoyancy increasing means may be arranged within a volume of the right elongated member 30 formed by external elements. The volume formed by external elements may have a box-like shape essentially corresponding to the shape of the right space S2.

According to an aspect of the present disclosure, the buoyancy increasing means may comprise the external element configured to provide the volume of the elongated member 20, 30 configured to prevent water to enter.

According to an aspect of the present disclosure, the respective elongated member 20, 30 is configured to be lowered towards the upper side 4a of a track 4 of a track assembly T1, T2 so as to reduce said space.

The respective elongated member 20, 30 may be configured to be lowered towards the upper side 4a of a track 4 of a track assembly T1, T2 in any suitable way using any suitable means.

Thus, the left elongated member 20 is configured to be lowered towards the upper side 4a of a track 4 of the left track assembly T1 so as to reduce said left space S1.

Thus, the right elongated member 30 is configured to be lowered towards the upper side 4a of a track 4 of the right track assembly T2 so as to reduce said right space S2.

According to an aspect of the present disclosure, the elongated member 20, 30 comprises an under structure portion 12, 14 of the vehicle body, said under structure portion 12, 14 being configured to be lowered towards the upper side 4a of a track 4 of a track assembly T1, T2. The left elongated member 20 comprises the left under structure portion 12 of the vehicle body 10 configured to be lowered towards the upper side 4a of the track 4 of the left track assembly T1. The right elongated member 30 comprises the right under structure portion 14 of the vehicle body 10 configured to be lowered towards the upper side 4a of the track 4 of the right track assembly T2.

According to an aspect of the present disclosure, the elongated member 20, 30 comprises expansion means configured to expand the elongated member 20, 30 so as to introduce the elongated member within said space S1, S2. The left elongated member 20 comprises expansion means configured to expand the left elongated member 20 so as to introduce the left elongated member 20 within said left space S1. The right elongated member 30 comprises expansion means configured to expand the right elongated member 30 so as to introduce the right elongated member 30 within said right space S2.

According to an aspect of the present disclosure, the elongated member comprises buoyancy increasing means. According to an aspect of the present disclosure, the buoyancy increasing means comprises one or more floating blocks and/or one or more bellow devices and/or one or more expandable volumes.

According to an aspect of the present disclosure, the elongated member 20, 30 comprises buoyancy increasing means 22, 32. The left elongated member 20 comprises left buoyancy increasing means 22. The right elongated member 30 comprises buoyancy increasing means 22.

According to an aspect of the present disclosure, the buoyancy increasing means 22, 32 comprises one or more bellow devices arranged in connection to the respective elongated member 20, 30. According to an aspect of the present disclosure the left buoyancy increasing means 22 comprises one or more bellow devices arranged in connection to the left elongated member 20. According to an aspect of the present disclosure the right buoyancy increasing means 32 comprises one or more bellow devices arranged in connection to the right elongated member 30.

According to an alternative aspect of the present disclosure, the buoyancy increasing means may comprise one or more floating blocks. According to an aspect of the present disclosure the left buoyancy increasing means 22 comprises one or more floating blocks arranged in connection to the left elongated member 20. According to an aspect of the present disclosure the right buoyancy increasing means 32 comprises one or more floating blocks arranged in connection to the right elongated member 30.

According to an aspect of the present disclosure, the buoyancy increasing means 22, 32 may comprise one or more bellow devices and/or one or more floating blocks.

According to an alternative aspect of the present disclosure, the buoyancy increasing means may comprise one or more expandable volumes. An expandable volume may be any suitable expandable volume for increasing buoyancy in connection to reduction of said space S1, S2. The respective elongated member 20, 30 may be constituted by expandable volumes. The respective elongated member 20, 30 may be configured to house expandable volumes. An expandable volume may be comprised in, comprise or constitute a bellow device.

The left elongated member 20 may be constituted by an expandable volume. The left elongated member 20 may be configured to house one or more expandable volumes. An expandable volume may be comprised in, comprise or constitute a bellow device.

The right elongated member 30 may be constituted by an expandable volume. The right elongated member 30 may be configured to house one or more expandable volumes. An expandable volume may be comprised in, comprise or constitute a bellow device.

According to an aspect of the present disclosure, the buoyancy increasing means 22, 32 may comprise one or more bellow devices and/or one or more floating blocks and/or one or more expandable volumes.

According to an aspect of the present disclosure, the means for reducing said S1, S2 space comprises a control arrangement 100 for controlling introduction of the elongated member 20, 30 for reducing said space in connection to an amphibious operation. The control arrangement 100 is according to an aspect of the present disclosure arranged to control the left elongated member 20 for reducing the left space S1 and the right elongated member 30 for reducing the right space S2.

The control arrangement 100 is according to an aspect operably connected to the respective elongated member 20, 30 via links. The control arrangement 100 is according to an aspect configured to control the respective elongated member 20, 30 via said links for providing introduction of the respective elongated member 20, 30 within the respective space S1, S2.

The control arrangement 100 is according to an aspect of the present disclosure arranged to control the buoyancy increasing means 22, 32 of the respective elongated member 20, 30 for reducing the space S1, S2 in connection to an amphibious operation.

The control arrangement 100 may be configured to control introduction of the elongated member 20, 30 for reducing said space S1, S2 in connection to an amphibious operation based on one or more of position of the tracked vehicle V1, level of water surrounding the vehicle, amphibious operation activation by operator.

The position of the vehicle V1 may be determined by means of any suitable detector unit, now shown, for detecting vehicle position. The position of the vehicle may be determined by means a Global Navigation satellite System, GNSS, e.g. a global positioning system, GPS, for determining the position of the vehicle and thus whether the tracked vehicle V1 is driving on land and thus is performing a land operation or whether the tracked vehicle V1 is in connection to perform an amphibious operation. The position of the tracked vehicle may be determined by means of one or more sensor units arranged on the tracked vehicle, such as one or more cameras and/or one or more laser scanners. Thus, the detector unit for detecting vehicle position may comprise a Global Navigation satellite System and/or one or more sensor units such as cameras.

The control arrangement 100 may according to an aspect of the present disclosure comprise or be operably connected to the detector unit for detecting vehicle position so as to determine whether the vehicle is in connection to perform an amphibious operation.

The level of water surrounding the tracked vehicle V1 may be determined by means of any suitable water level sensor device, not shown, arranged in connection to the vehicle. The control arrangement 100 may according to an aspect of the present disclosure comprise or be operably connected to the water level sensor device. The control arrangement 100 may according to an aspect of the present disclosure be configured to activate reduction of said space by means of controlling said elongated members 20, 30.

The amphibious operation activation by operator may comprise any suitable operator activatable activation member, not shown. Such an activation member may be any suitable activation member such as a switch, touch screen, lever or the like. The control arrangement 100 may according to an aspect of the present disclosure comprise or by operably connected to the operator activatable activation member activate reduction of said space by means of controlling said elongated members 20, 30.

The control arrangement 100 is according to an aspect of the present disclosure arranged to control the elongated member 20, 30 for increasing the space S1, S2 when in connection to a land operation after an amphibious operation.

The control arrangement 100 is according to an aspect of the present disclosure arranged to control the elongated member 20, 30 so that said space is reduced in connection to an amphibious operation, i.e. swimming operation, and so that a reduced space is returned to the space S1, S2 before reduction when changing to land operation and so that the space S1, S2 is maintained during land operation.

Figure 4A:
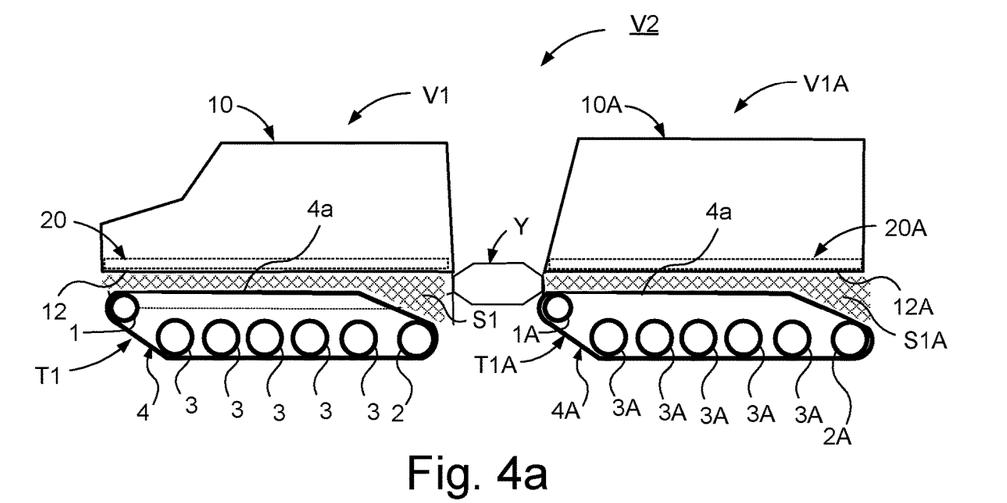
FIG. 4a schematically illustrates a side view of an articulated tracked vehicle during a land operation according to an embodiment of the present disclosure.
Figure 4B:
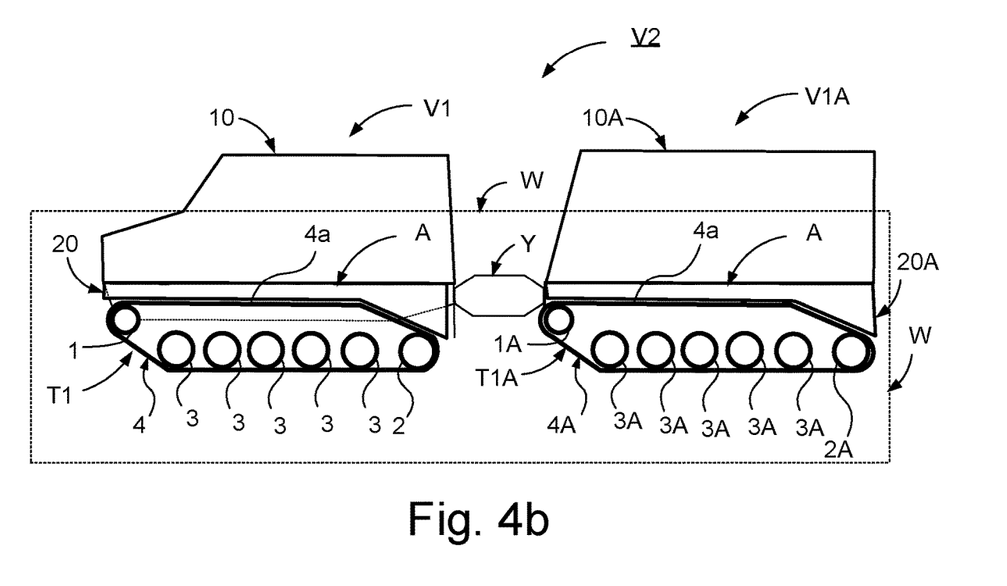
FIG. 4b schematically illustrates a side view of the articulated tracked vehicle in FIG. 4a during an amphibious operation according to an embodiment of the present disclosure.

FIG. 4*a* schematically illustrates a side view of an articulated tracked vehicle V2 during a land operation according to an embodiment of the present disclosure; and FIG. 4*b* schematically illustrates a side view of the articulated tracked vehicle V2 in FIG. 4*a* during an amphibious operation according to an embodiment of the present disclosure.

Thus, the amphibious tracked vehicle according to an aspect of the present disclosure may be a stand alone tracked vehicle V1 as shown in FIG. 2 and FIG. 3*a*-*b* or an articulated tracked vehicle V2 as illustrated in FIG. 4*a*-*b*.

The articulated tracked vehicle V2 comprises a first tracked vehicle unit V1 and a second tracked vehicle unit V1A pivotably connected to the first vehicle unit V1 via an articulation joint Y. The first vehicle unit V1 is configured to be the leading vehicle and the second vehicle unit V1A the trailing vehicle. The first vehicle unit V1, according to an aspect of the present disclosure, essentially corresponds to the amphibious tracked vehicle illustrated in FIG. 2 and FIG. 3*a*-*b* and therefore has the same reference sign V1.

Thus, the first vehicle unit V1 comprises a track assembly pair comprising opposite track assemblies for driving the vehicle unit V1, a left track assembly T1 shown in FIG. 4*a*-*b*, and a right track assembly.

The first vehicle unit V1 comprises a vehicle body 10. The track assembly pair is suspendedly connected to the vehicle body 10.

The respective track assembly, in FIG. 4*a*-*b* illustrated with the left track assembly T1, comprises two end wheels 1, 2 in the form of a front wheel 1 and a rear wheel 2, and further a plurality of road wheels 3 there between. The front wheel 1 is according to the present disclosure a drive wheel 1 and the rear wheel 2 is according to the present disclosure a tension wheel 2. The respective track assembly, in FIG. 4*a*-*b* illustrated with the left track assembly T1, further comprises a plurality of road wheels 3.

The respective track assembly, in FIG. 4*a*-*b* illustrated with the left track assembly T1, further comprises an endless track 4. Said endless track 4 is configured to be disposed around said end wheels 1, 2 and plurality of road wheels 3. The endless track 4 is thus configured to run around the drive wheel 1, tension wheel 2 and plurality of road wheels 3. Each track assembly thus comprises an endless track 4 arranged to run over a set of wheels of the track assembly T1.

The endless track 4 is a propulsion track 4 running around said wheels 1, 2, 3 for driving the vehicle unit V1. The endless track 4 has an outer side with an outer surface which, during swimming operation, will be in contact with water and move the water when the endless track is running around the wheels 1, 2, 3. When the endless track is running around the wheels 1, 2, 3 a portion of the outer side will be faced upwardly and thus be an upper side 4a and an opposite portion of the outer side will face downwardly and thus be an underside 4b.

The drive wheel 1 is configured to be operated by any suitable drive means such as an internal combustion engine and or/or an electric motor. The drive wheel 1 is configured to be rotated by the drive means for rotating the endless track for driving the vehicle V1.

The vehicle body 10 comprises under structure portions, a left under structure portion 12 shown in FIG. 4a and an opposite right under structure portion, configured to, during land operation of the vehicle V2, run over an upper side 4a of a track 4 of a track assembly at a distance from the upper side 4a of the track 4, providing a space, the space S1 in connection to the left track assembly T1A being shown in FIG. 4a.

Further, the second vehicle unit V1A, pivotably connected to the first vehicle unit V1, comprises a track assembly pair comprising opposite track assemblies for the vehicle unit V1A, a left track assembly T1A shown in FIG. 4a-b, and a right track assembly.

The second vehicle unit V1A comprises a vehicle body 10A. The track assembly pair is suspendedly connected to the vehicle body 10A.

The respective track assembly, in FIG. 4a-b illustrated with the left track assembly T1A, comprises two end wheels 1A, 2A in the form of a front wheel 1A and a rear wheel 2A, and further a plurality of road wheels 3A there between. The front wheel 1A is according to the present disclosure a drive wheel 1A and the rear wheel 2A is according to the present disclosure a tension wheel 2A. The respective track assembly, in FIG. 4a-b illustrated with the left track assembly T1A, further comprises a plurality of road wheels 3A.

The respective track assembly, in FIG. 4a-b illustrated with the left track assembly T1A, further comprises an endless track 4A. Said endless track 4A is configured to be disposed around said end wheels 1A, 2A and plurality of road wheels 3A. The endless track 4A is thus configured to run around the drive wheel 1A, tension wheel 2A and plurality of road wheels 3A. Each track assembly thus comprises an endless track 4A arranged to run over a set of wheels of the track assembly T1A.

The endless track 4A is a propulsion track 4A running around said wheels 1A, 2A, 3A for driving the vehicle unit V1. The endless track 4A has an outer side with an outer surface which, during swimming operation, will be in contact with water and move the water when the endless track is running around the wheels 1A, 2A, 3A. When the endless track is running around the wheels 1A, 2A, 3A a portion of the outer side will be faced upwardly and thus be an upper side 4a and an opposite portion of the outer side will face downwardly and thus be an underside 4b.

The drive wheel 1A is configured to be operated by any suitable drive means such as an internal combustion engine and or/or an electric motor. The drive wheel 1A is configured to be rotated by the drive means for rotating the endless track for driving the second vehicle unit V1A. The drive wheel 1A is according to an aspect configured to be operated by a drive means arranged in the first vehicle unit V1, wherein drive force provided by the drive means is transferred to the drive wheel 1A of the second vehicle unit V1A via any suitable powertrain.

The vehicle body 10A comprises under structure portions, a left under structure portion 12A shown in FIG. 4a and an opposite right under structure portion, configured to, during land operation of the vehicle V2, run over an upper side 4a of a track 4 of a track assembly at a distance from the upper side 4a of the track 4, providing a space, the space S1A in connection to the left track assembly T1A being shown in FIG. 4a.

The articulated tracked vehicle V2 comprises an arrangement A for facilitating swimming operation of the articulated tracked vehicle V2. The arrangement A comprises means for, during swimming operation, reducing said space S1, S1A between said under structure portions 12, 12A and upper side 4a of the tracks of the respective vehicle unit V1, V1A of the articulated tracked vehicle V2, so as to reduce flow of water between under structure portion and upper side of the track 4 of the respective track assembly T1, T1A caused when the tracks 4 are driven. Thus, when the tracks are driven they are rotating, providing said flow of water during swimming operation.

Said means for reducing said space comprises elongated members 20, 20A for reducing the space S1, S1A in connection to, i.e. above, the respective track assembly T1, T1A of the first and second vehicle units V1, V1A of the articulated tracked vehicle V2.

The means for reducing said space comprises, for the first vehicle unit V1, a left elongated member 20 for reducing the left space S1 and a right elongated member, not shown, for reducing the right space. The elongated members 20 for the for the first vehicle unit V1 may correspond to the elongated members 20, 30 for the tracked vehicle V1 described above with reference to FIGS. 2 and 3a-b.

The means for reducing said space comprises, for the second vehicle unit V1A, a left elongated member 20A for reducing the left space S1A and a right elongated member, not shown, for reducing the right space. The elongated members 20 for the for the second vehicle unit V1A may correspond to the elongated members 20, 30 for the tracked vehicle V1 described above with reference to FIGS. 2 and 3a-b.

According to an aspect of the present disclosure, the respective elongated member 20, 20A is configured to provide a volume within the respective space S1, S1A, which volume does not allow water there through. According to an aspect of the present disclosure, the respective elongated member 20, 20A is configured to provide an outer structure providing a volume within the respective space S1, S1A, which outer structure does not allow water there through.

According to an aspect of the present disclosure, for at least one of the first and second vehicle units V1, V1A of the articulated tracked vehicle V2, the elongated member 20, 20A comprises an under structure portion 12, 12A of the vehicle body, said under structure portion 12, 12A being configured to be lowered towards the upper side 4a of a track 4 of a track assembly T1, T1A.

According to an aspect of the present disclosure, for at least one of the first and second vehicle units V1, V1A of the articulated tracked vehicle V2, the elongated member 20, 20A comprises expansion means configured to expand the elongated member 20, 20A so as to introduce the elongated member within said space S1, S1A.

According to an aspect of the present disclosure, for at least one of the first and second vehicle units V1, V1A of the articulated tracked vehicle V2, the elongated member 20, 20A comprises buoyancy increasing means. According to an aspect of the present disclosure, the buoyancy increasing means comprises one or more floating blocks and/or one or more bellow devices and/or one or more expandable volumes.

According to an aspect of the present disclosure, the means for reducing said S1, S1A space may comprise a control arrangement for controlling introduction of the elongated member 20, 20A for reducing said space in connection to an amphibious operation. The control device may be any suitable control device. The control device may be a control device 100 as described with reference to FIG. 2, 3*a-b*.

Figure 5:
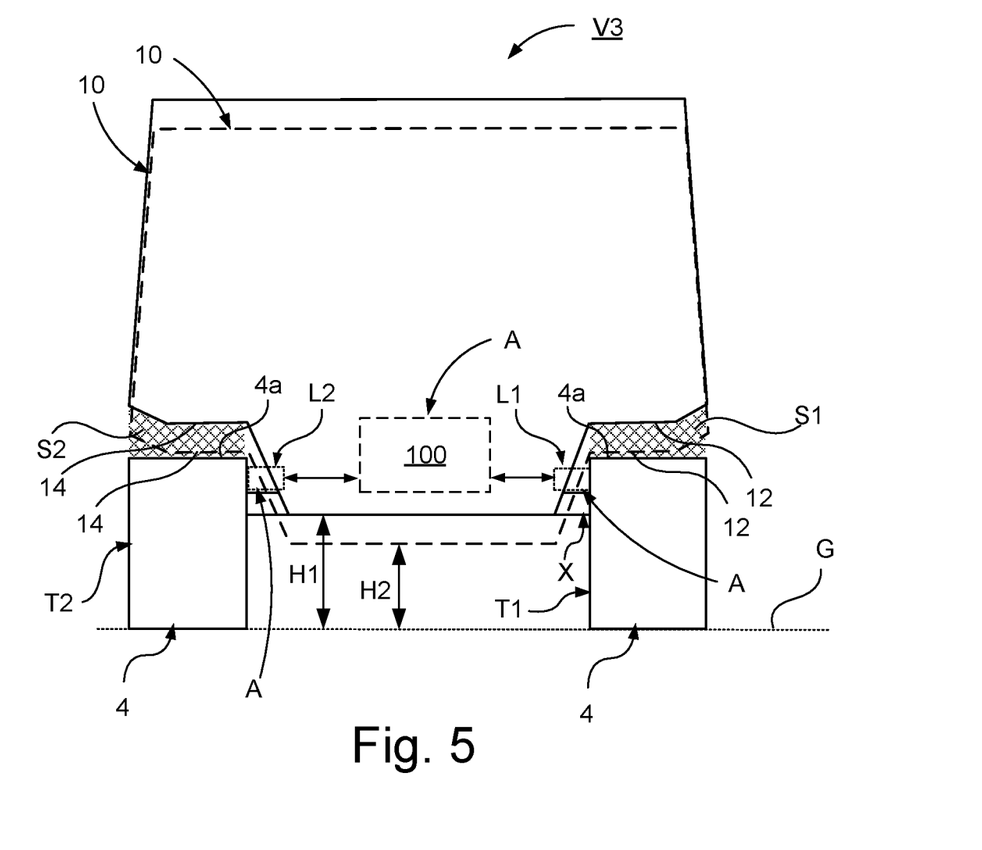
FIG. 5 schematically illustrates a front view of a tracked vehicle for land and amphibious operation according to an embodiment of the present disclosure.

FIG. 5 schematically illustrates a front view of a tracked vehicle V3 for land and amphibious operation according to an embodiment of the present disclosure.

The tracked vehicle V3 has essentially the same general design as the tracked vehicle V1 in FIGS. 2 and 3*a-b*.

The tracked vehicle V3 comprises a track assembly pair T1, T2 comprising opposite track assemblies T1, T2 for driving the vehicle, a left track assembly T1, and a right track assembly T2.

The tracked vehicle V3 comprises a vehicle body 10. The track assembly pair is suspendedly connected to the vehicle body 10.

The respective track assembly further comprises a drive means driven endless track 4. Said endless track 4 is configured to be disposed around end wheels and a plurality of road wheels. Each track assembly T1, T2 thus comprises an endless track 4 arranged to run over a set of wheels of the track assembly T1, T2.

The amphibious tracked vehicle V3 comprises swim arrangement A for facilitating amphibious operation of the vehicle V3. The arrangement A comprises means for reducing said space S1, S2 between said under structure portions 12, 14 and upper side 4*a* of the tracks so as to reduce flow of water between under structure portion 12, 14 and upper side of the track 4 of the respective track assembly T1, T2 provided by the tracks rotating during swimming operation.

According to this embodiment of the arrangement A the means for reducing said space S1, S2 comprises a level changing device L1, L2 for reducing the distance between the under structure portions 12, 14 and the upper side 4*a* of the tracks 4 by lowering the vehicle body 10 relative to the track assembly pair T1, T2.

Thus, the level changing device L1, L2 is configured to change the level of the vehicle body 10 relative to the track assembly pair T1, T2. Thus, the level changing device L1, L2 is configured to change the level of the vehicle body 10 between a first level intended for land operation and a second level intended for amphibious operation. The first level of the vehicle body provides a first distance between the under structure portions 12, 14 and the upper side 4*a* of the tracks providing the space S1, S2 and the second level of the vehicle body 10 provides a second reduced distance between the under structure portions 12, 14 and the upper side 4*a* of the tracks reducing said space S1, S2.

Thus, the level changing device L1, L2 is configured to change the distance from the central underside 10*b* to the ground G between a first height H1 intended for land operation of the vehicle V3 and a second height H2 intended for amphibious operation. The first height H1 is greater than the second height H2. The first height H1 corresponds to a first ground clearance of the vehicle and the second height H2 corresponds to a second, lower ground clearance of the vehicle V3.

The level changing device L1, L2 may be comprised in a suspension system of the vehicle V3. The level changing device L1, L2 may comprise any suitable device for changing the level of the vehicle body relative to the track assembly pair T1, T2. The level changing device L1, L2 may comprise a first level changing member L1 configured to be connected between the vehicle body and the first track assembly T1 and a second level changing member L2 configured to be connected between the vehicle body and the first track assembly T2.

The level changing device L1, L2 may comprise one or more hydraulic cylinders connecting the respective track assembly T1, T2 with the vehicle body and configured to provide level change of the vehicle body relative to the track assembly pair T1, T2. Such hydraulic cylinders may be part of a gas hydraulic suspension configuration of the suspension system of the vehicle V3.

According to an embodiment of the arrangement A the means for reducing said space S1, S2 comprises a control arrangement 100 for controlling reduction of said space. The control arrangement 100 is according to an aspect operably connected to the level changing device L1, L2 via links. The control arrangement 100 is according to an aspect configured to control the level changing device L1, L2 via said links for providing the level change of the vehicle body 10.

According to an aspect of the present disclosure the embodiment of the present disclosure described with reference to FIG. 5 may be combined with the embodiment of the present disclosure described with reference to FIG. 2, 3*a-b*, and the embodiment of the present disclosure described with reference to FIG. 4*a-b*.

The level changing device L1, L2 according to the embodiment of FIG. 5 may, together with elongated members 20, 30 of the embodiment of FIG. 2, 3*a-b*, or elongated members 20, 20A of the embodiment in FIG. 4*a-b*, be comprised to reduce said space S1, S2 between said under structure portions and upper side 4*a* of the tracks of the tracked vehicle according to the present disclosure, so as to reduce flow of water between under structure portion and upper side of the track 4 of the respective track assembly caused when the tracks 4 are driven.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. An amphibious tracked vehicle, said tracked vehicle comprising one or more vehicle bodies and at least one track assembly pair per vehicle body, said track assembly pair being suspendedly connected to the vehicle body, the track assembly pair comprising two track assemblies for driving the vehicle, each track assembly comprising a drive means driven endless track arranged to run over a set of wheels of the track assembly, the vehicle body comprising under structure portions, each under structure portion running over an upper side of the track of each track assembly, each under structure portion being configured to be arranged at a distance from the upper side of the track during land operation of the vehicle so that a space is provided between each under structure portion and the upper side of the track of the corresponding track assembly, wherein during a swimming operation of the vehicle, an elongated member extending substantially along a length of the vehicle body is configured to be selectively expanded into the space provided between each under structure portion and the upper side of the track of the corresponding track assembly to variably occupy a portion of the space for reducing said space so as to, in connection to the swimming operation, reduce the flow of water between the under structure portion and the upper side of the track caused when the tracks are driven.

2. The vehicle according to claim 1, wherein the elongated member introduced within said space is configured to increase the displacement ability of the vehicle.

3. The vehicle according to claim 1, wherein the elongated member is configured to be lowered towards the upper side of the track of each track assembly so as to reduce said space.

4. The vehicle according to claim 1, wherein the elongated member comprises an under structure portion of the vehicle body, said under structure portion being configured to be lowered towards the upper side of the track of each track assembly.

5. The vehicle according to claim 1, wherein the elongated member comprises expansion means configured to expand the elongated member so as to introduce the elongated member within said space.

6. The vehicle according to claim 1, wherein the elongated member comprises one or more floating blocks and/or one or more bellow devices and/or one or more expandable volumes.

7. The vehicle according to claim 1, further comprising a control arrangement for controlling reduction of said space.

8. The vehicle according to claim 7, wherein the control arrangement is configured to control reduction of said space based on one or more of position of the vehicle, level of water surrounding the vehicle, amphibious operation activation by operator.

9. The tracked vehicle according to claim 1, wherein said tracked vehicle is an articulated tracked vehicle comprising a first vehicle unit and a second vehicle unit pivotably connected to the first vehicle unit via an articulation joint, each of said vehicle units comprising a vehicle body and track assembly pair suspendedly connected to respective vehicle body.

* * * * *